March 8, 1955     L. L. COPELAND     2,703,534
TOY VEHICLE

Filed Jan. 10, 1949     3 Sheets-Sheet 1

Inventor
Lynn L. Copeland
By *[signature]*
Attorney

March 8, 1955 L. L. COPELAND 2,703,534
TOY VEHICLE
Filed Jan. 10, 1949 3 Sheets-Sheet 2
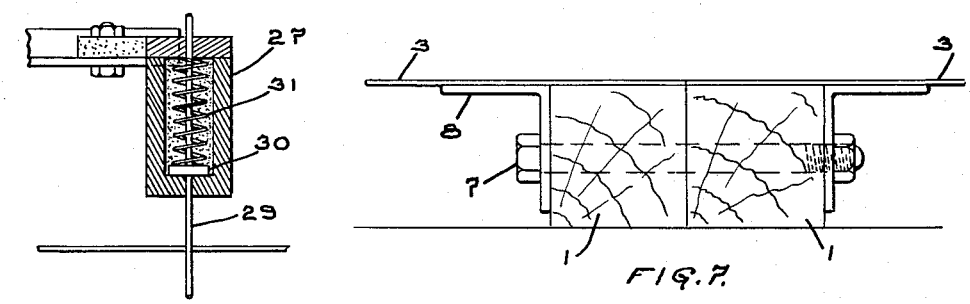
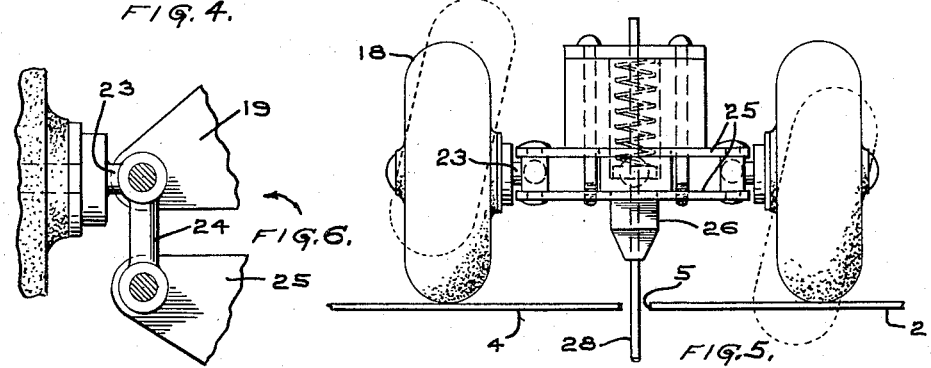
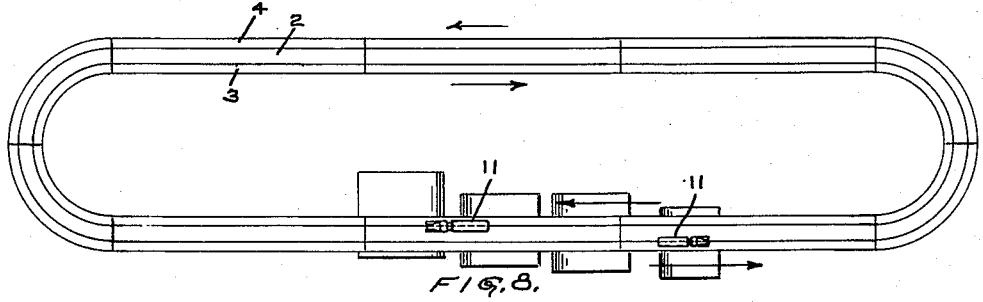
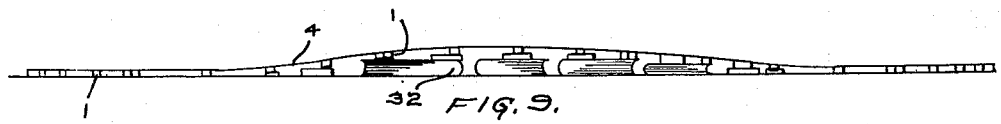
Inventor
Lynn L. Copeland
By Thomas W. Clark
Attorney March 8, 1955  L. L. COPELAND  2,703,534
TOY VEHICLE Filed Jan. 10, 1949  3 Sheets-Sheet 3

Inventor
Lynn L. Copeland
By Thomas W. J. Clark
Attorney

United States Patent Office 2,703,534
Patented Mar. 8, 1955

2,703,534

TOY VEHICLE

Lynn L. Copeland, New York, N. Y.

Application January 10, 1949, Serial No. 70,091

4 Claims. (Cl. 104—140)

This invention relates to a toy electrically propelled highway vehicle. It may be an automobile, a truck, an articulated carrier or even a horse drawn vehicle.

The toy of this invention is primarily for entertainment but it is apparent that it may be used for instructing minors in traffic rules and safe driving. The tracks used for miniature trains have heretofore been so rigid in construction and limited in design that they lack adaptability for use for driven highway toys. The instant invention includes a flexible metal electrically conducting road or highway of a width suitable for the vehicles, which of course must have its vertical curves made in the initial roadway but the horizontal curves may be made by the user at will in the form of hills and valleys built upon the floor by using books or other supports under the roadway. The vehicle travelling on this roadway is preferably rubber wheeled for driving and one set of the wheels is mounted not only steerably but on a longitudinal pivot in the vehicle so as to assure contact of all the wheels with the roadway regardless of its lateral or vertical curvature. The vehicle has brushes or other means to gather the current from the roadway constituting terminals electrified from a source of electricity and these brushes carry the current to a small motor which drives the wheels or other propelling means of the vehicle.

The track is divided preferably centrally of each road bearing surface and the roadway on each side constitutes one terminal of the electrical circuit. The brushes or other current gathering means are on opposite sides of the vehicle and are maintained on the respective sides of the roadway by means of pins or other means placed near each end of the vehicle which ride in the slot or space between the sections of the roadway or highway and thus maintain the vehicle substantially centrally on the highway and the brushes on their respective terminals. In the preferred embodiment of the invention one of these slot guided pins or means serves to turn the wheels or steer the vehicle so that it moves with ease about either a curved or on a straight course. Since each side of the slot in which these pins or other means operate carries current of opposite sign, the pin or other means will be of less horizontal width than the width of the slot and one of the pins or other slot engaging means will be insulated so as to prevent a short circuit through the vehicle or the pins or other slot engaging means.

Another object of the invention is to construct a driven vehicle that may serve as the motive power for an articulated road engaging toy, such as a truck with cab and trailer and in such a construction it will be preferred that the trailing section likewise have a pin which should likewise be insulated from the rest of the vehicle to guide that section of the truck around the highway or course. Or the articulated road engaging toy of the invention may be in the form of a wagon or even possibly a carriage and have horses hitched forward of the wagon or carriage and the shafts to which the horses are hitched would be pivotably connected with the wagon. In this construction it will be desirable likewise to have a pin or other slot engaging means on the horse to insure his staying on the highway as the vehicle is pushed around in back of him by the electric motor driving means.

Other objects and advantages of the invention will be apparent from the following description and the accompanying drawing forming a part hereof and in which:

Figure 4 is a longitudinal cross-sectional view of the mounting for the rear highway engaging pin.

Figure 5 is a front elevation of the front steerable wheels and of the front highway engaging pin.

Figure 6 is a horizontal fragmentary view of the front wheel steering member.

Figure 7 is a fragmentary horizontal elevational view of the track section joining mechanism.

Figure 8 is a top plan view of an oval highway built up with an intermediate hill in one section.

Figure 9 is a vertical elevation of the track highway of Figure 8.

In the drawings similar numerals refer to similar parts throughout the several views.

Figure 1:
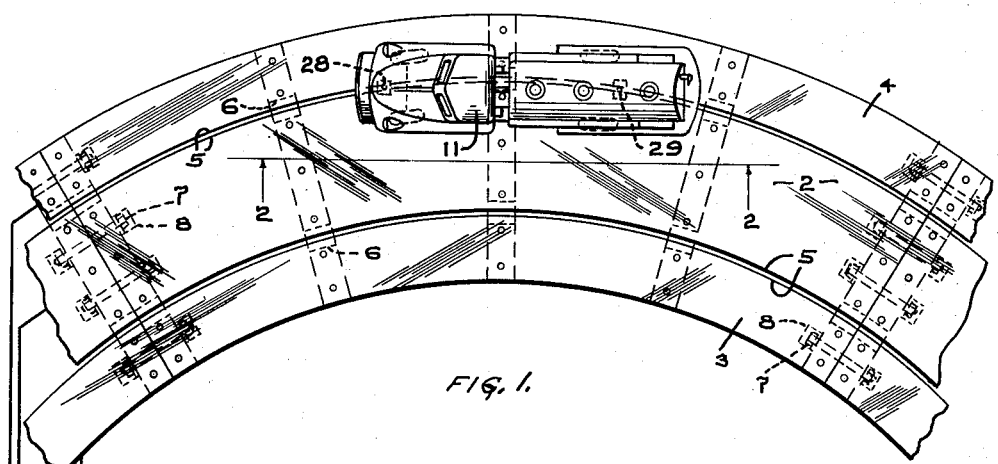
Figure 1 shows a top plan view of a curved section of highway accommodating traffic moving in two directions and with a truck thereon.

The highway is constructed of metal sheet material or other electrical conducting material and it is built up of longitudinally extending sections, two of which combined are of a width to constitute a roadway and each of which sections is an electrical conductor. The sections are preferably mounted on insulating cross members 1 such as shown in Figure 1, in which there are three sections, the center one, 2, constituting one terminal of an electric circuit and the two outside spaced sections 3 and 4 being electrically joined together and constituting the opposite terminal of an electric circuit. The sections of track as shown may obviously be used for vehicles going in the same direction or for a highway with single lanes on each side for vehicles going in opposite directions.

The sections are spaced a uniform distance one from the other as shown at 5 and the supporting members, 1, are cut out as shown at 6 adjacent the spaces. Longitudinal sections made up of parallel sections may be joined together by means of bolts 7 placed through supporting members 1 at the ends of each longitudinally assembled section. As shown in Figure 7 conducting angles 8 are rigidly affixed to the ends of the conducting terminal sections and through these angles the bolts 7 pass to assure a good electrical connection between the respective longitudinal sections of the transversely sectioned highway.

Figure 10:
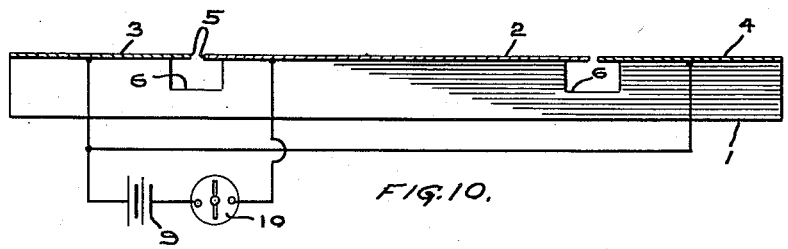
Figure 10 is a cross-sectional view of the highway.

In Figures 1 and 10 an electrical source 9 is shown for the current with a switch 10 and with leads to the respective longitudinal sections of the highway.

The vehicle 11 has a motor 12 under the forward end thereof which drives a drive shaft 13 connected by screw and gear 14 to drive the rear wheels 15 of the vehicle. The motor 11 obtains its current from the highway through means of brushes 16 and 17 which resiliently drag on the highway, one on each longitudinal section as the same are divided by the slot 5. The front wheels 18 are mounted on a bolster 19 which is longitudinally pivoted to the body of the truck by a rod 20 passing through the horizontal bore 21 on the forward part of the chassis 22 of the vehicle. The wheels themselves are mounted on stub axles 23 having arms 24 at right angles thereto and the stub axles and arms are pivoted at their right angle in the bolster 19. The steering arms are connected by a tie rod member 25. Both the bolster 19 and tie rod member 25 are in the form of two parallel plates.

In this tie rod 25 and also in the rear of the vehicle are mounted housings 26 and 27 having pins 28 and 29 projecting vertically therein. The pins have identical disks 30 affixed to them within the housings with springs 31 above the disks. These springs bear upon the disks and the top of the housing and tend to retain the pins 28 and 29 down, projecting into the slot 5 between adjacent sections of the roadway and thereby maintain the truck upon the highway, and the brushes on the respective sides of the electrically conducting highway. The pins are of less diameter than the width of the slot 5 and therefore one pin would not make a short between the sections of the highway. Since it is preferable to have two pins to guide the truck one of the pins should be mounted in insulation. The housing 27 in the form shown is made of an insulating plastic or rubber material in order not to create a short between the highway sections through the vehicle.

It will be apparent that the use of these spring depressed pins allows the vehicle to be placed on a plane surface, lacking any slot, in which event the pins ride up in their respective housings against the action of their respective springs.

It will be apparent that the pin 28 mounted on the tie rod member 25 will steer the front wheels of the vehicle to guide the vehicle around a curvilinear course. The course or highway may also have hills and valleys as shown in Figures 8 and 9 and if desired the vertical curves could be banked which would cause a movement of the front wheels about the longitudinal shaft 20 as shown in dotted lines in Figure 5. This movement allowed the front wheels of the vehicle by this mounting assures that the rear wheels 15 will always be on the highway to give traction to the vehicle. In Figures 8 and 9 books 32 are used to build up the hills for the horizontally bendable track 1.

Figure 2:
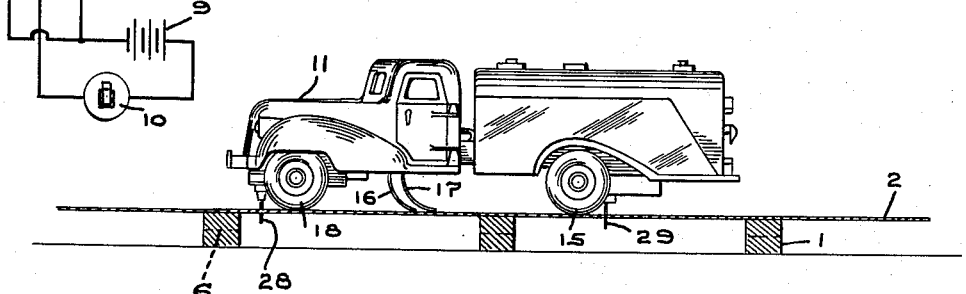
Figure 2 is a side elevational view of the truck and a sectional view of the highway on line 2—2 of Figure 1.
Figure 3:
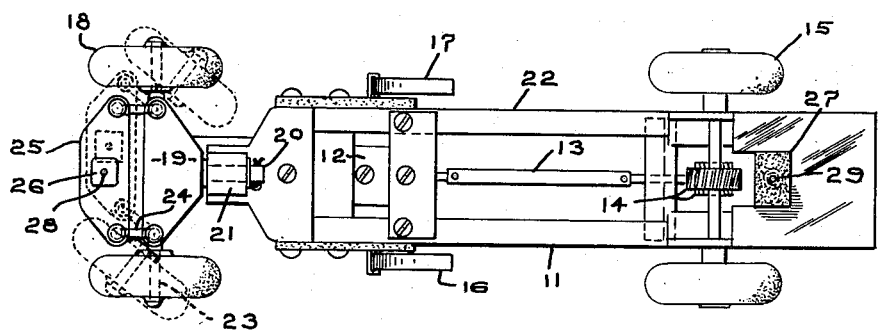
Figure 3 is an inverted plan view of the truck.
Figure 12:
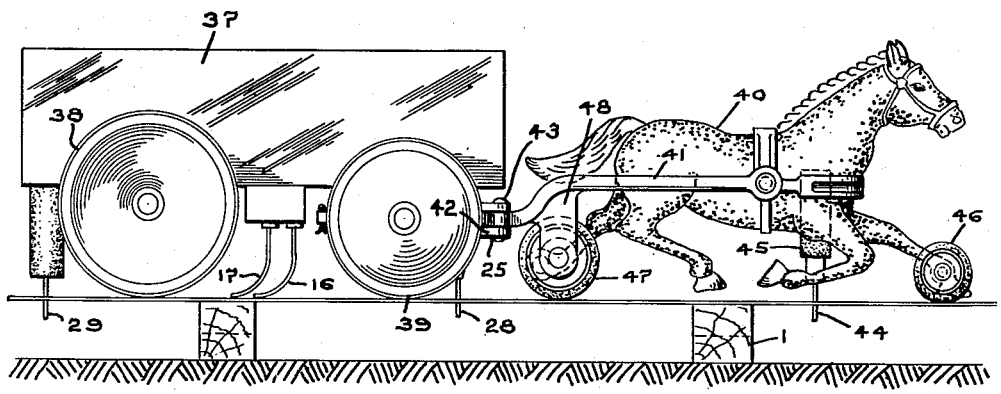
Figure 12 is a similar view of a simulated horse drawn vehicle.
Figure 11:
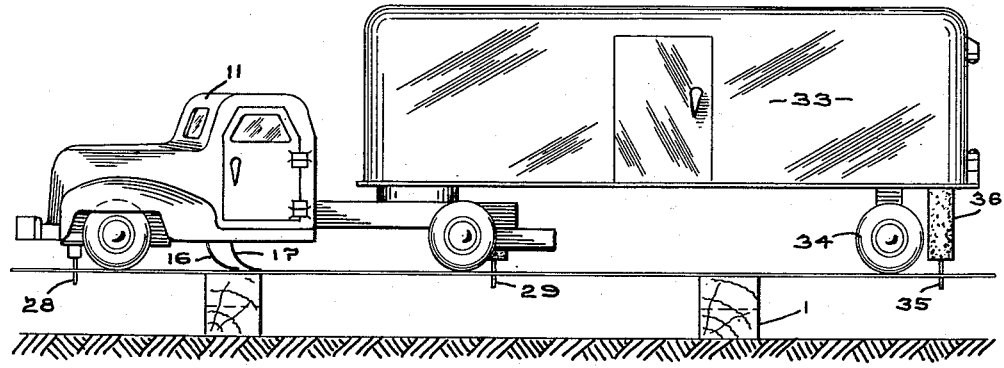
Figure 11 is a vertical elevational view of an articulated truck on the highway.

In Figures 11 and 12 articulated road vehicles are shown, that is Figure 11 being an articulated truck in which the front section is identical to that shown in Figures 1, 2 and 3. The rear section 33 of the truck is similarly mounted on wheels 34 and a pin 35 rides in the slot 5 of the highway which is mounted in an insulated housing 36 adjacent the rear of the trailer section 33.

The motive power of the truck may likewise be placed in a wagon 37 as shown in Figure 12, the rear wheels 38 of which will be driven similarly to the wheels 15 by a motor taking its current from the highway by means of identical brushes 16 and 17. The front wheels 39 may be identically steerably mounted as the front wheels 18 of the truck of Figures 1, 2 and 3, with front steering pin 28 and rear insulatedly mounted pin 29 to keep the wagon on the highway and the brushes on their respective sides of the highway. The horse 40 which appears to draw the vehicle may be harnessed in shafts 41 hinged to the tie rod member 42 identical to tie rod member 25 by pin 43. The horse is kept on the highway by means of pin 44 mounted in insulated housing 45 in the body of the horse.

The horse as shown is mounted on wheels 46 and 47, the rear wheel 47 being mounted in a bracket 48 on the shafts 41 at the wheel axis and the horse's foot is attached to the wheel off center so as to give a motion of movement to the horse by the rotation of the wheel 47 on the highway.

It will be apparent that both the horse drawn vehicle and cab and trailer are articulated road vehicles.

It will be apparent that a most interesting driven toy is made possible by the use of the highway which toy may have many modifications, some of which are shown. The toy could be used for instructing children in the necessity of vehicles staying on their side of the highway, both on straight away courses, on curves and over hills. Many changes could be made in the embodiments illustrated without departing from the invention as defined in the claims.

What is claimed as new and is desired to be secured by Letters Patent is:

1. An electrically propelled toy wheeled vehicle for riding on a highway comprising two longitudinally extending sections in side-by-side relation and spaced from each other and each constituting a separate electrical terminal, the vehicle having wheels adjacent each end, certain of the wheels being adapted to ride on each section, and the wheels at one end being steerable, a bolster pivoted longitudinally of the vehicle on which said steerable wheels are mounted to allow vertical tilting movement to the said steerable wheels, steering arms connected to said steerable wheels, means on each side of the vehicle for making electrical connection to one section of the highway, motor means in the vehicle to propel the same receiving current from said electrical connection means, and vertically extending pins adjacent each end of the vehicle adapted to extend between the highway sections to maintain the vehicle thereon and the electrical connection means on their respective section thereof, one of said pins being connected to the steering arms to steer the vehicle along the highway.

2. An electrically propelled toy wheeled vehicle for riding on a highway comprising two longitudinally extending sections in side-by-side relation and spaced from each other and each constituting a separate electrical terminal, the vehicle having electrically non-conducting wheels adjacent each end, and the wheels at one end being steerable, a bolster pivoted longitudinally of the vehicle on which said steerable wheels are mounted to allow vertical tilting movement to said steerable wheels, steering arms connected to said steerable wheels, brushes extending from each side of the vehicle for electrically connecting the same to one section of the highway, motor means in the vehicle to propel the same receiving current from said brushes and vertically extending pins adjacent each end of the vehicle adapted to extend between the highway sections to maintain the vehicle thereon and the brushes on their respective sections thereof, one of said pins being connected to the steering arms to steer the vehicle along the highway.

3. An electrically propelled toy vehicle adapted to ride upon and be supported by both sections of a current conducting highway longitudinally divided into two separate spaced sections each section constituting one terminal of the current, the vehicle having highway bearing wheels adjacent each end, the wheels at one end being steerable, a bolster pivoted longitudinally of the vehicle on which said steerable wheels are mounted, whereby said wheels tilt vertically, steering arms connected to the steerable wheels, means adjacent each end of the vehicle adapted to project into the space between the highway sections to maintain the vehicle on the highway, motor means in the vehicle to propel the same by means of said wheels and means in said vehicle adapted to gather current from both sections of the highway and conduct it to the motor means, said steering arms being connected to the said projecting means at one end of the vehicle to steer the vehicle when moving on the highway.

4. An electrically propelled toy wheeled vehicle for riding on a highway comprising two longitudinally extending sections in side-by-side relation and spaced from each other and each constituting a separate electrical terminal, the vehicle having wheels adjacent each end and the wheels at one end being steerable, steering arms connected to said steerable wheels, brushes extending from each side of the vehicle for electrically connecting the same to one section of the highway, motor means in the vehicle to propel the same receiving current from said brushes and vertically extending pins adjacent each end of the vehicle adapted to extend between the highway sections to maintain the vehicle thereon and the brushes on their respective sections thereof, a tie rod member connecting said steering arms, one of said pins being connected to the tie rod member to steer the vehicle along the highway, a bolster mounting said steering arms, tie rod member and said one pin, and a rod for longitudinally pivotally connecting said bolster to said vehicle to allow vertical tilting movement of said steerable wheels.

References Cited in the file of this patent

UNITED STATES PATENTS

| Number | Name | Date |
|---|---|---|
| 927,517 | Fageol | July 13, 1909 |
| 1,507,723 | Avery | Sept. 9, 1924 |
| 2,068,403 | Ekstrom | Jan. 19, 1937 |
| 2,109,403 | Roussey et al. | Feb. 22, 1938 |
| 2,112,072 | Cullen | Mar. 22, 1938 |
| 2,537,281 | Roshak | Jan. 9, 1951 |
| 2,539,360 | Bartlett | Jan. 23, 1951 |